United States Patent [19]

Faigle et al.

[11] Patent Number: 5,585,597

[45] Date of Patent: Dec. 17, 1996

[54] AIR BAG INFLATOR

[75] Inventors: Ernst M. Faigle, Dryden; Tracy S. Sparks, Lapeer, both of Mich.

[73] Assignee: TRW Vehicle Safety Systems Inc., Lyndhurst, Ohio

[21] Appl. No.: 441,326

[22] Filed: May 15, 1995

[51] Int. Cl.$^6$ ................................................ C06D 5/00
[52] U.S. Cl. ........................ 102/530; 102/288; 102/289; 280/741
[58] Field of Search .................... 102/530, 531, 102/443, 288, 289; 280/736, 741; 422/164–167

[56] References Cited

U.S. PATENT DOCUMENTS

| | | | |
|---|---|---|---|
| 4,806,180 | 2/1989 | Goetz et al. | 280/741 |
| 4,919,897 | 4/1990 | Bender et al. | 102/530 |
| 5,345,875 | 9/1994 | Anderson . | |
| 5,346,254 | 9/1994 | Esterberg | 280/741 |
| 5,390,954 | 2/1995 | Faigle et al. | 280/736 |
| 5,398,966 | 3/1995 | Hock | 280/741 |

FOREIGN PATENT DOCUMENTS

WO92/22440  12/1992  WIPO .................................. 280/736

*Primary Examiner*—Harold J. Tudor
*Attorney, Agent, or Firm*—Tarolli, Sundheim, Covell, Tummino & Szabo

[57] ABSTRACT

An apparatus (14) for inflating an inflatable vehicle occupant restraint (12) comprises means (22) defining an elongated combustion chamber (30) having opposed ends (24, 26). The combustion cheer (30) contains a mass (32) of gas generating material. An igniter (92) is positioned at one end of the combustion chamber (30) for igniting the mass (32) of gas generating material. The mass of gas generating material provides a substantially continuous burn path for the full length of the combustion chamber (30). The mass of gas generating material comprises at least one expansion area (124) between the combustion chamber opposed ends (24, 26), which expansion area is essentially free of gas generating material. The expansion area (124) has a free volume which is effective to attenuate pressure waves within the combustion chamber.

14 Claims, 2 Drawing Sheets

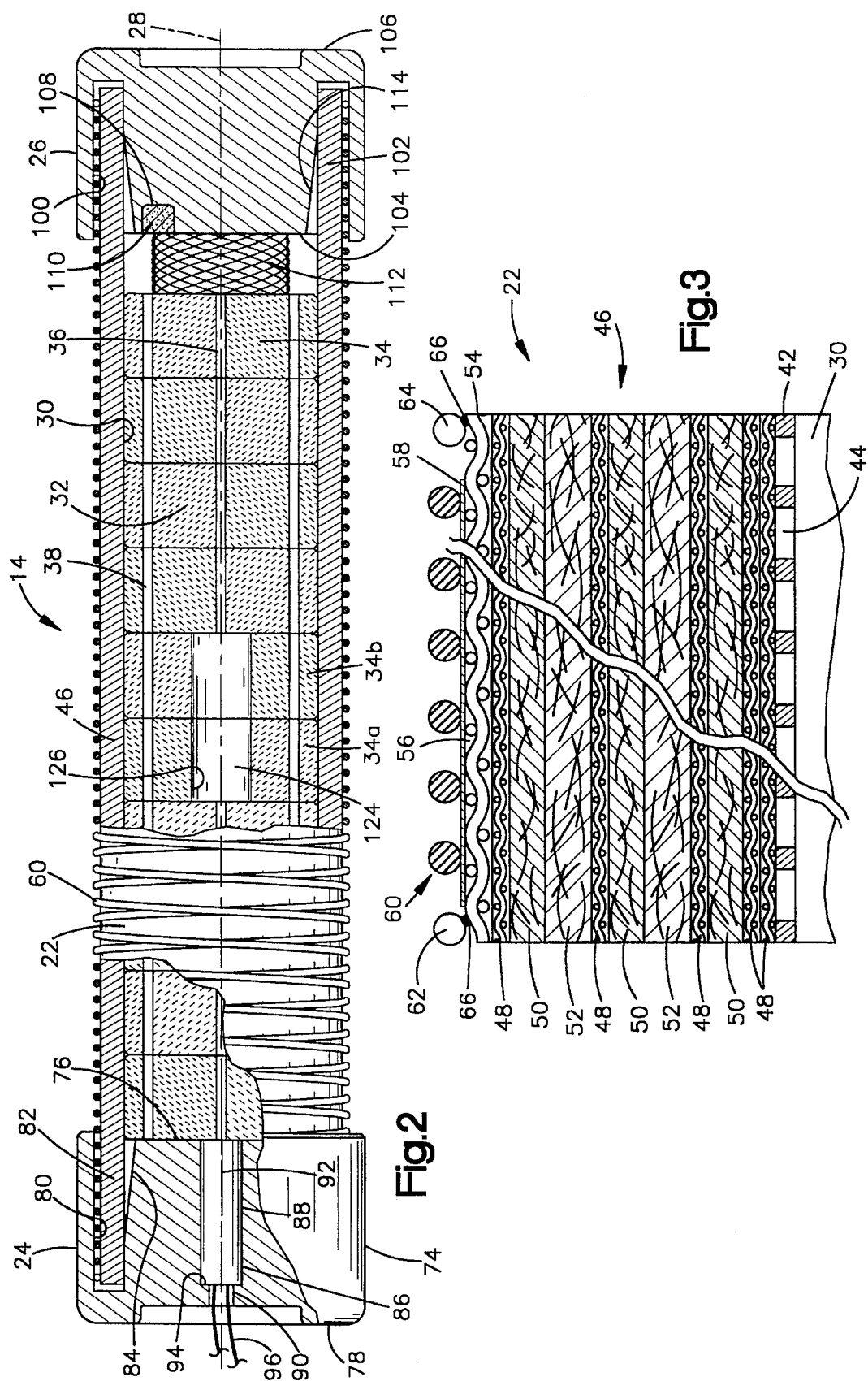

AIR BAG INFLATOR

FIELD OF THE INVENTION

The present invention relates to an inflator for inflating a vehicle occupant restraint, such as an air bag, and particularly to a means for attenuating shock waves produced within the inflator during ignition of gas generating material in the inflator.

BACKGROUND OF THE INVENTION

A vehicle occupant restraint apparatus comprises a restraint, such as an air bag, and an inflator for providing a gas for inflating the restraint. The inflator contains an ignitable gas generating material which, when ignited, generates the gas. The gas generating material is contained within a combustion chamber.

An actuator or squib is customarily located at one end of the combustion chamber. In the event of a collision, pyrotechnic material in the actuator or squib is ignited. This burning pyrotechnic material is forcibly ejected into the combustion chamber to ignite a substantial amount of the gas generating material at one end of the combustion chamber.

The ignition of the pyrotechnic material in the actuator or squib and the subsequent ignition of the gas generating material can create shock waves which travel the length of the combustion chamber. The inflator commonly has one or more filters between the combustion chamber and the air bag. These filters are positioned in the flow path for the gas which is generated in the combustion chamber. The shock waves which are generated can subject the filters to almost instantaneous and substantial stresses.

U.S. Pat. No. 5,345,875 discloses a gas generator with means to attenuate a shock wave. The generator comprises a propellant container containing a plurality of propellant grains and an igniter for igniting the propellant grains. A shock wave barrier in the form of an apertured plate is positioned in the propellant container close to the igniter. The barrier attenuates the shock waves emanating from the igniter. The object of the barrier is to prevent fragmentation of the propellant grains.

SUMMARY OF THE INVENTION

The present invention relates to an apparatus for inflating an inflatable vehicle occupant restraint. The apparatus comprises means defining an elongated combustion chamber having opposed ends. The combustion chamber contains a mass of gas generating material. An igniter is positioned at one end of the combustion chamber for igniting the gas generating material. The mass of gas generating material provides a substantially continuous burn path for the full length of the combustion chamber. The mass of gas generating material comprises at least one expansion area which is essentially free of gas generating material. The expansion area has a free volume which is effective to attenuate pressure waves within the combustion chamber.

Preferably, the expansion area is positioned approximately midway between the opposed ends of the combustion chamber.

In one embodiment of the present invention, the mass of gas generating material is in the form of a plurality of cylindrical grains which are aligned in a stacked relationship within the combustion chamber. At least one of the grains in the stack of grains is hollowed to define said expansion area.

Preferably, the grains have a plurality of aligned apertures which extend in an axial direction through the grains.

Preferably, the grains are coated with an ignition enhancing coating which is energetic, and the pressure waves are comprised in part of an advancing shock wave from the igniter and an advancing flame front from ignition of said coating.

The means defining an elongated combustion chamber comprises a tubular part. The tubular part includes a cylindrical filter means for filtering the gas which is generated within the combustion chamber. The tubular part is free of a tubular body wall having defined gas flow openings located radially with respect to the combustion chamber.

BRIEF DESCRIPTION OF THE DRAWINGS

Further features of the present invention will become apparent to those skilled in the art to which the present invention relates from reading the following description with reference to the accompanying drawings, in which:

FIG. 2 is an enlarged partial section view of an inflator for the restraint apparatus of FIG. 1; and FIG. 3 is an enlarged detailed view of a part of the inflator of FIG. 2.

DESCRIPTION OF PREFERRED EMBODIMENT

Figure 1:
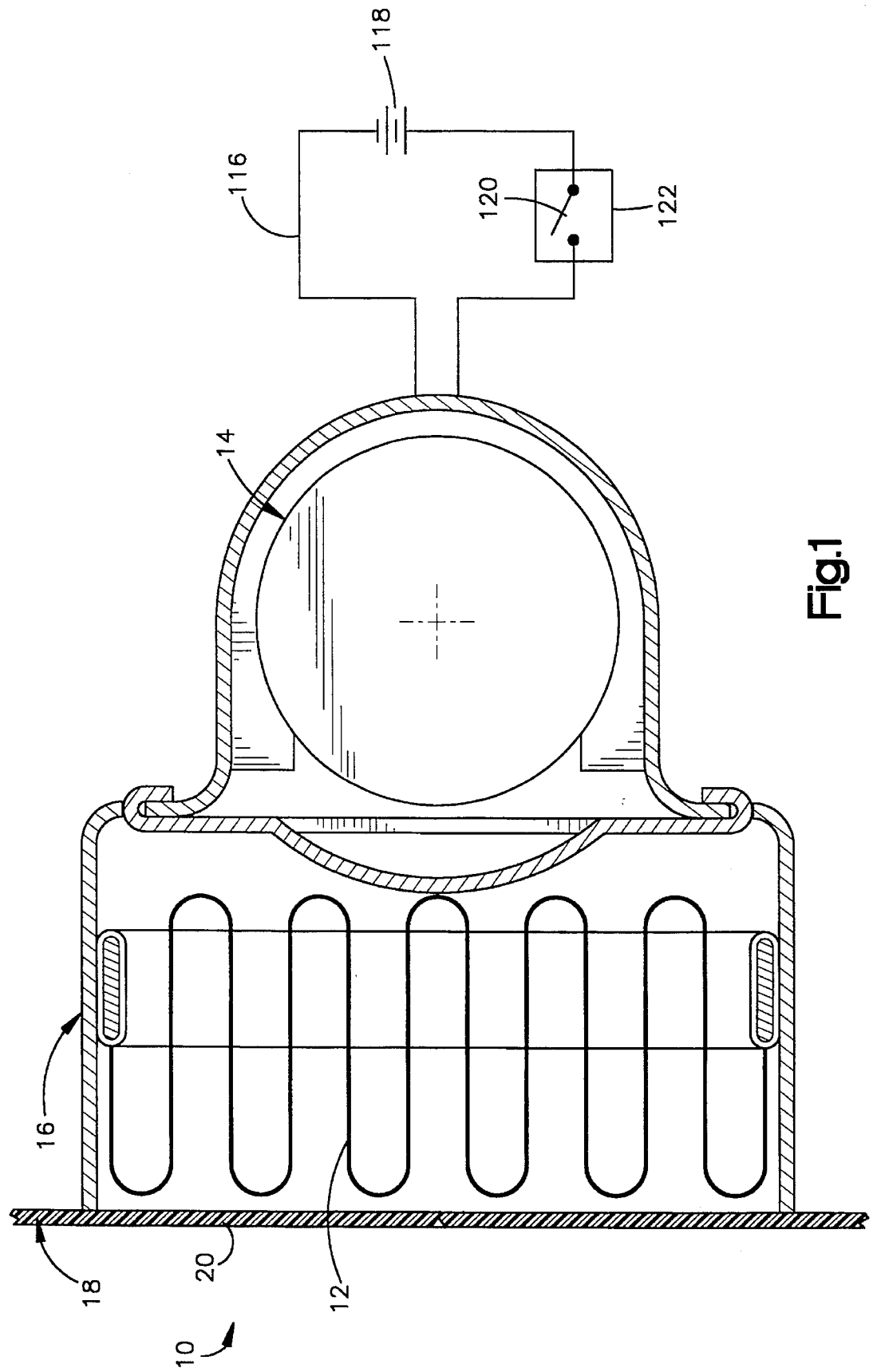
FIG. 1 is a schematic view of a vehicle occupant restraint apparatus in accordance with the present invention.

U.S. Pat. No. 5,390,954, issued Feb. 21, 1995, assigned to the assignee of the present application, discloses a vehicle occupant restraint apparatus with which the present invention is useful. This restraint apparatus is illustrated in FIG. 1 of the drawings herein.

Referring to FIG. 1, the vehicle occupant restraint apparatus 10 includes an inflatable vehicle occupant restraint 12, such as an air bag, and an inflator 14. The air bag 12 and the inflator 14 are housed in a reaction canister 16 which is mounted in a vehicle, such as in the dashboard or instrument panel 18 of the vehicle. The dashboard or instrument panel 18 has a deployment door 20 through which the air bag 12 is inflated.

When the vehicle experiences a predetermined amount of vehicle deceleration, such as occurs in a collision of a magnitude requiring inflation of the air bag 12, the inflator 14 is actuated. The inflator 14 contains a gas generating material, to be described. The gas generating material is ignited, and a gas is emitted from the inflator 14. The gas flows into the air bag 12 and inflates the air bag. As the air bag 12 inflates, it moves against the deployment door 20 in the dashboard or instrument panel 18. The air bag 12 moves outwardly past the dashboard or instrument panel 18 into the space between an occupant of the vehicle and the dashboard or instrument panel to help restrain the occupant.

Details of the inflator 14 are more fully shown in FIG. 2. The inflator 14 has a generally cylindrical shape defined by a tubular body part 22. A first end cap 24 is positioned at one end of the tubular body part 22, and a second end cap 26 is positioned at the opposite end of the tubular body part 22. The tubular body part 22 has a longitudinal axis 28, and the end caps 24 and 26 are centered on the longitudinal axis. The tubular body part 22 defines a cylindrical combustion chamber 30 which extends longitudinally between the first and second end caps 24 and 26. A mass 32 of ignitable gas generating material is contained within the combustion chamber 30 between the end caps 24 and 26. The gas generating material 32 can have any suitable composition and configuration known in the art. However, a preferred gas generating material is a plurality of cylindrically-shaped, coated bodies, known as grains 34, such as shown in U.S. Pat. No. 4,806,180, issued Feb. 21, 1989 and assigned to the assignee of the present application.

Preferably, each of the grains 34 has a central passageway 36 which is coincident with the longitudinal axis 28 of the tubular body part 22. In addition, each grain 34 has a plurality of circumferentially spaced passageways 38 which are parallel to passageway 36 and which are positioned, in a concentric circle, radially outward from passageway 36. By way of example, each grain 34 may have six (6) or more of the radially spaced passageways 38. The cylindrical grains 34 are aligned in a stacked relationship in the combustion chamber 30. In the embodiment of FIG. 2, ten (10) grains 34 are stacked in the combustion chamber. The circumferentially spaced passageways 38 may be aligned to define continuous paths which extend longitudinally from one grain to another. The passageways 36 and 38 promote uniform combustion of the gas generating material.

As shown in FIG. 2, the grains 34 have a diameter which is approximately the same as the diameter of the combustion chamber 30. Thus, the grains 34 extend essentially to the radially inner circumference of the tubular body part 22 and substantially fill the combustion chamber 30, except as hereinafter described.

A preferred composition of the grains 34 is a fuel and an oxidizer. A preferred fuel is an alkali metal azide such as sodium azide. A preferred oxidizer is a metal oxide, such as copper oxide or iron oxide. The composition can also comprise a burn rate enhancer such as sodium nitrate or sodium perchlorate. Binders, such as bentonite, and fibers, such as graphite fibers, are frequently included in the composition to strengthen the grains. The grains can also comprise coolants and other ingredients, as is well known in the art. Such compositions are known to be relatively energetic.

Preferably, the grains 34 are coated with an ignition enhancing coating. One suitable such coating is disclosed in U.S. Pat. No. 4,806,180, mentioned above. The coating comprises 30–50 weight percent alkali metal azide, 40–60 weight percent inorganic oxidizer, such as sodium nitrate or sodium perchlorate, 1–15 weight percent metal silicate, such as sodium silicate, and about 5–15 weight percent boron. This composition is considered to be even more energetic than the composition of the grains. The function of the coating is to promote rapid ignition of the gas generating grains.

Details of the tubular body part 22 of FIG. 2 are shown in the enlarged detail of FIG. 3. The tubular body part 22 has a tubular inner wall 42. The inner wall 42 defines the cylindrical combustion chamber 30. The wall 42 has a plurality of gas flow openings 44 which extend radially through the wall 42. The wall 42 is preferably formed by perforating a thin sheet of metal to form the openings 44, and then forming the sheet of metal into a cylindrical configuration. Being a thin sheet of metal, the tubular inner wall 42 adds only minimally to the weight of the inflator and provides little strength to the tubular body part 22.

A generally cylindrical tubular filter 46 extends circumferentially around the inner wall 42. The filter 46 has a plurality of generally cylindrical filter layers, which include layers 48 of wire mesh screen, layers 50 of steel wool, and layers 52 of ceramic/glass wool. The layers 48, 50 and 52 are formed by laying out flat, flexible sheets of steel wool and ceramic/glass wool in overlying relationship with layers of wire mesh screen, and by winding the overlying layers around the tubular inner wall 42.

The filter 46 further includes an outer layer 54 of wire mesh screen. The outer layer 54 is formed by wrapping another layer of wire mesh screen around the layers 48, 50 and 52, and by welding the outer layer 54 to the adjacent layer 48 of wire mesh screen. The wire mesh screen of the outer layer 54 has openings that are larger than the openings in any of the underlying layers 48 of wire mesh screen. A plenum 56 is thus defined by the space between the interwoven screen wires which form the outer layer 54.

The tubular body part 22 further includes a sheet 58 of rupturable pressure controlling material, and a support member 60. The sheet 58 is formed of an aluminum foil and extends circumferentially and axially over the filter 46. As with sheet 42, the sheet 58 provides little strength to the tubular body part 22. The support member 60 is a strand or strands of metal wire which also extend circumferentially and axially over the filter 46. The support member 60 has opposite ends 62 and 64 which are fixed to the outermost filter layer 54 by welds 66. The support member strands are helically would over the outer surface of the sheet 58, and are tensioned around the sheet 58 and the underlying filter 46 so as to apply a radially directed compressive force through the sheet 58 to the filter layers 48, 50 and 52. This radially directed compressive force presses the filter layers 48, 50 and 52 together to eliminate voids between adjoining layers, and also presses the layers into an overlying relationship which is substantially uniform axially and circumferentially throughout the filter 46. The strands of support member 60 are not intended to be the equivalent, strengthwise, of a metal housing conventionally used in the art.

This structure of FIGS. 2 and 3 is thus particularly characterized in that the tubular body part 22 is essentially free of a structural, load-carrying body wall having defined gas flow openings located radially outward with respect to the combustion chamber.

Referring back to FIG. 2, the first end cap 24 has a cylindrical outer surface 74, an inner end face 76, and an outer end face 78. The inner end face 76 has a continuous annular recess 80 which extends from the inner end face 76 a substantial distance into the end cap in the direction of the outer end face 78. The annular recess 80 is coaxial with the axis 28 of the tubular body part 22, and concentric with outer surface 74. A first end portion 82 of the tubular body part 22 is received within the annular recess 80 and extends into the recess 80 until it is close to the base of the recess. The first end cap 24 is chamfered at chamfer 84 in the open end of the recess 80 to facilitate insertion of the first end portion 82 of the tubular body part into the recess 80.

The first end cap 24 has an igniter compartment 86. The igniter compartment 86 extends axially through the first end cap 24 between the inner and outer end faces 76 and 78. The igniter compartment 86 is coaxial with the longitudinal axis 28 of the tubular body part 22. The igniter compartment 86 has a relatively large diameter portion 88, leading from the inner end face 76, and a smaller diameter portion 90, leading from the outer end face 78. The larger diameter portion 88 contains an igniter 92 which is seated against land 94 between the larger diameter portion 88 and the smaller diameter portion 90. A pair of electrical lead wires 96 extend from the igniter 92 through the small diameter portion 90 of the igniter compartment to the outside of the inflator.

The igniter 92 can be of any suitable construction. Conventionally, the igniter 92 contains a pyrotechnic charge which is ignited by the passage of an electric current through the lead wires 96. The pyrotechnic charge in the igniter 92 may have any of a number of suitable compositions well known in the art.

The second end cap 26 has a configuration similar to that of the first end cap 24. The second end cap 26 has an annular recess 100 into which the second end portion 102 of the tubular body part 22 is inserted. The second end portion 102 is seated so that it is close to the bottom of the recess 100. As with the first end cap 24, the second end cap 26 is chamfered at chamfer 114 to facilitate insertion of the second end portion 102 of the tubular body part 22 into the recess 100. The recess 100 is formed in an inner end face 104 of the second end cap 26. The second end cap 26 also has an outer end face 106, similar to the first end cap 24.

The second end cap, on its inner end face 104, also has a shallow depression 108, spaced radially outward from the central axis of the cap. The shallow depression 108 contains an auto-ignition material 110. The purpose of the auto-ignition material is to ignite the gas generating material 32 in the inflator 14 in the event of a fire or other incident which causes the inflator to be exposed to high temperatures. The auto-ignition material 110 may have any suitable composition known in the art which allows it to auto-ignite when the inflator 14 reaches a predetermined temperature. When the auto-ignition material 110 ignites, it emits products of combustion which move into contact with the ignitable gas generating material 32 and ignite the gas generating material.

The inflator 14 also includes a spring 112 which is positioned between the inner end face 104 of the second end cap 26 and the stack of gas generating grains 34. The spring 112 protects the grains 34 of gas generating material from being damaged within the combustion chamber 30 from vibrations or other forces which might cause the grains 34 to abrade or, in some cases, shatter. For instance, the grains 34 are close together, and the spring 112 allows the grains 34 to separate enough to release gas trapped within the grains which, if not released, could shatter the grains. A compression pad or other structure can be used in place of the spring 112 to perform this function.

To assemble the inflator of FIG. 2, one of the end caps 24 or 26 is fitted on the tubular body part 22. The tubular body part end portion 82 or 102 is seated in the annular recess of the end cap. The end cap is then crimped, using a suitable tool, to deform the end cap radially inwardly into sealing compression against the end portion of the tubular body part 22. Although this crimping can be carried out with sufficient force that the end cap seals the end of the tubular body part received by the end cap, additional sealing means can be placed in the recess of the end cap if desired. Following this, the grains 34 of gas generating material 32 and the compression spring 112 are stacked within the tubular body part 22. The opposite end cap is then positioned on the tubular body part 22 and crimped against the tubular body part following the same procedure as with the other end cap. The crimping of the second end cap can be with sufficient force to seal the end of the tubular body part by the end cap. If desired, however, additional sealing means can be positioned in the bottom of the end cap recess to seal the second end cap to the tubular body part.

Referring to FIG. 1, the vehicle occupant restraint apparatus 10 includes an electrical circuit 116. The electrical circuit has a power source 118, and a switch 120. The switch 120 is part of a deceleration sensor 122. The deceleration sensor 122 senses the occurrence of a predetermined amount of vehicle deceleration indicative of a collision requiring inflation of the air bag 12, and closes the switch 120. This causes an electrical current to flow within the electrical circuit and ignite the pyrotechnic material in igniter 92 (FIG. 2).

When the pyrotechnic material in igniter 92 is ignited, it produces combustion products which are ejected into the combustion chamber 30 of the inflator 14 with substantial force. This forcible ejection of burning pyrotechnic material creates a shock wave in the combustion chamber. This shock wave travels the length of the combustion chamber, and rebounds off the opposite inner end face 104 of the end cap 26. The shock wave then reverses in direction back toward the first end cap 24.

At the same time, the gas generating material in the combustion chamber is ignited. This ignition establishes a flame front on the coating material of the gas generating grains 34. Since the coating is very energetic, this flame front travels rapidly, at about the same speed as the igniter shock wave. The flame front contacts the end face 104 of the end cap 26, and rebounds in the direction of the first end cap 24 along with the igniter shock wave, burning unburned coating material. Still further, a second flame front is established by the ignition of the slower burning gas generating material of grains 34. This flame front advances rapidly down the combustion chamber from the first end cap 24 in the direction of the second end cap 26. The speed of this flame front is enhanced by the configuration of the gas generating grains 34, for instance, the passageways 38 in the grains, but is still slower than the speed of the igniter shock wave and coating flame front.

The flame front from the ignited gas generating grains 34 collides with the rebounding shock wave and coating flame front about in the middle of the combustion chamber, midway between the end caps 24, 26. The shock wave and the flame fronts are all pressure waves. It has been observed that the collision of these pressure waves creates a reaction pressure wave of almost explosive force. The main direction in which the reaction pressure wave can travel is radially. Thus, the reaction pressure wave strikes the tubular filter 46 of the inflator 14 with substantial force.

To prevent excessive distortion of the tubular filter 46 from the impact of the pressure wave, the stack of grains 34 of gas generating material is arranged to provide an expansion area 124 within the stack. The expansion area 124 is a void or area within the stack which is free of gas generating material. In the embodiment illustrated in FIG. 2, the expansion area 124 is positioned on the longitudinal axis 28 of the tubular body part 22. The expansion area 124 is also positioned about midway between the end caps 24 and 26.

The expansion area 124, in the embodiment illustrated in FIG. 2, is formed by employing two grains 34a and 34b of gas generating material which have a configuration different from the other grains in the stack of gas generating grains. Specifically, the grains 34a and 34b are hollowed-out or have a cut-out center area 126 of significantly larger diameter than the central passageways 36 of the remaining grains of gas generating material. At the same time, the grains 34a and 34b retain annular portions of gas generating material around the expansion area 124 to maintain a substantially continuous combustion path from one end of the combustion chamber 30 to the other.

The expansion area 124 has a volume which is sufficiently great to attenuate the radially directed reaction pressure wave which is established within the combustion chamber 30. The volume which has been found to be effective is approximately 2–10% of the total volume of gas generating material. In the present instance, the grains 34 are each about one and one-half inches in diameter, and about five-eighths inch in thickness. The expansion area 124 has a diameter of about one-third inch and a length of about one inch or a volume of about one-third cubic inch.

In essence, it is believed that the expansion area 124 provides a free volume removed from the tubular filter 46 in which the reaction pressure wave expands and is thus partially dissipated. This reduces the strength of the reaction pressure wave. In addition, the remaining gas generating material in grains 34a and 34b provides a momentary buffer between the tubular filter and the reaction pressure wave. These combined factors were found to be effective in minimizing filter damage.

If desired, a plurality of axially spaced apart expansion areas can be positioned within the combustion chamber, although satisfactory results have been achieved by a single expansion area centered between the end caps 24 and 26 of the inflator as shown in FIG. 2.

The above description of the present invention was made with reference to an inflator in which the combustion chamber is defined by a tubular body part which is essentially free of a structural, load-carrying wall having defined gas flow openings located radially outward with respect to the combustion chamber. The present invention is also applicable to inflator assemblies which do have a structural, load-carrying tubular body wall. By way of example, one such inflator is disclosed in U.S. Pat. No. 4,806,180, mentioned above. The inflator in this patent comprises a cylindrical metal housing. A plurality of grains of gas generating material are stacked axially, one on top of the other, in the housing. An igniter is positioned axially in the housing contiguous with the gas generating grains. The housing is a load-carrying member and has a plurality of openings by which gas, generated from combustion of the gas generating grains, escapes from the housing. An annular filter is disposed within the housing around the stack of gas generating grains. The annular filter is located radially inward from the housing. The housing has sufficient load-carrying capability that little deformation of the filter occurs during combustion of the gas generating grains. However, it has been found that during combustion of the gas generating grains, the grains can expand outwardly against the filter and block the flow of gas in areas of the filter. This is particularly evident where the grains have axially aligned passageways and combustion of the grains is initiated internally in the grains. This expansion can result in a non-uniformity of gas flow through the filter and the development of hot spots in the filter. In the present invention, it was found that the expansion area within the mass of gas generating material reduced the expansion of the gas generating grains against the filter, which in turn reduced the formation of hot spots in the filter.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant restraint comprising:
   (a) means for defining a combustion chamber;
   (b) a plurality of bodies of gas generating material within said combustion chamber, each of said bodies of gas generating material having surface means for defining a central passageway through each of said bodies;
   (c) an actuatable igniter at one end of said combustion chamber for igniting said gas generating material, said gas generating material when ignited creating a first flame front and a second flame front, said first flame front moving longitudinally through said combustion chamber in a first direction and rebounding from a second end of said combustion chamber opposite said one end and moving in a second direction opposite said first direction, said second flame front moving longitudinally through said combustion chamber in said first direction at a speed slower than the speed of said first flame front such that said second flame front collides with said first flame front moving in said second direction, the collision of said first and second flame fronts creating a radially acting pressure wave; and
   (d) means for attenuating said radially acting pressure wave comprising surface means on at least one of said bodies of gas generating material for defining a central passageway which is larger in diameter than the other of said central passageways.

2. The apparatus of claim 1 wherein said at least one body of gas generating material is located in a middle third of the distance between said opposed ends of said combustion chamber.

3. The apparatus of claim 2 wherein said central passageway of said at least one body of gas generating material has a volume equal to about 2% to about 10% of the volume of said gas generating material in said combustion chamber.

4. The apparatus of claim 3 wherein said plurality of bodies of gas generating material are in a stacked relationship within said combustion chamber.

5. The apparatus of claim 4 wherein said bodies of gas generating material have a plurality of passages, other than said central passageways, which extend in an axial direction through said bodies of gas generating material.

6. The apparatus of claim 5 wherein said bodies of gas generating material are coated with an ignition enhancing coating, said first flame front being created by the ignition of said coating.

7. The apparatus of claim 1 wherein said means defining a combustion chamber is free of a load-carrying tubular body wall having defined gas openings.

8. An apparatus for inflating an inflatable vehicle occupant restraint comprising:
   (a) means for defining a combustion chamber;
   (b) a plurality of bodies of gas generating material within said combustion chamber, each of said bodies of gas generating material having surface means for defining a central passageway through each of said bodies;
   (c) an actuatable igniter at one end of said combustion chamber for igniting said gas generating material, said gas generating material when ignited creating a first pressure wave and a second pressure wave, said first pressure wave moving longitudinally through said combustion chamber in a first direction and rebounding from a second end of said combustion chamber opposite said one end and moving in a second direction opposite said first direction, said second pressure wave moving longitudinally through said combustion chamber in said first direction at a speed slower than the speed of said first pressure wave such that said second pressure wave collides with said first pressure wave moving in said second direction, the collision of said first and second pressure waves creating a radially acting pressure wave; and
   (d) means for attenuating said radially acting pressure wave comprising surface means on at least one of said bodies of gas generating material for defining a central passageway which is larger in diameter than the other of said central passageways.

9. The apparatus of claim 8 wherein said at least one body of gas generating material is located in a middle third of the distance between said opposed ends of said combustion chamber.

10. The apparatus of claim 9 wherein said central passageway of said at least one body of gas generating material has a volume equal to about 2% to about 10% of the volume of said gas generating material in said combustion chamber.

11. The apparatus of claim 10 wherein said plurality of bodies of gas generating material are in a stacked relationship within said combustion chamber.

12. The apparatus of claim 11 wherein said bodies of gas generating material have a plurality of passages, other than said central passageways, which extend in an axial direction through said bodies of gas generating material.

13. The apparatus of claim 12 wherein said bodies of gas generating material are coated with an ignition enhancing coating, said first pressure wave being created by the ignition of said coating.

14. The apparatus of claim 8 wherein said means defining a combustion chamber is free of a load-carrying tubular body wall having defined gas openings.

* * * * *